United States Patent
Frankel et al.

(10) Patent No.: US 6,560,722 B1
(45) Date of Patent: May 6, 2003

(54) DEVELOPING AND DEPLOYING REAL-TIME HIGH-PERFORMANCE APPLICATIONS WITH DSPS

(75) Inventors: Robert Frankel, Goleta, CA (US); Elizabeth G. Keate, Santa Barbara, CA (US); Gilbert A. Pitney, Santa Barbara, CA (US); David A. Russo, Santa Barbara, CA (US); Karl Wechsler, Santa Barbara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/475,818

(22) Filed: Dec. 30, 1999

(51) Int. Cl.⁷ ................................................. H04B 1/74
(52) U.S. Cl. ......................... 714/38; 717/125; 717/128
(58) Field of Search .......................... 714/38; 713/200; 717/128, 125

(56) References Cited

U.S. PATENT DOCUMENTS

| | | | | |
|---|---|---|---|---|
| 5,524,250 A | * | 6/1996 | Chesson et al. | 345/684 |
| 5,862,381 A | * | 1/1999 | Advani et al. | 150/151 |
| 5,881,289 A | * | 3/1999 | Duggan et al. | 714/38 |
| 6,148,381 A | * | 11/2000 | Jotwani | 714/34 |
| 6,148,387 A | * | 11/2000 | Galasso et al. | 714/34 |
| 6,324,684 B1 | * | 11/2001 | Matt et al. | 714/34 |
| 6,438,713 B1 | * | 8/2002 | Taira et al. | 714/38 |

* cited by examiner

Primary Examiner—Robert Beausoliel
Assistant Examiner—Anne Damiano
(74) Attorney, Agent, or Firm—April M. Mosby; Wade James Brady, III; Frederick J. Telecky, Jr.

(57) ABSTRACT

To address the need for enhanced real-time analysis, Texas Instruments Inc. has developed a standard embedded infrastructure for its DSPs that provides unique visibility into real-time program execution. Integrated with TI's Code Composer Studio development environment, this infrastructure consists of two components: 1) DSP/BIOS, a tiny target-based run-time system that captures event and statistical information for the application and uploads it to the host (via a standard physical link such as JTAG) as the application executes in real-time; this DSP/BIOS system is integrated with the target application (C or DSP assembler); 2) Scope, a suite of host-based tools that allows designers to visually trace, monitor, and probe the DSP application as it executes in real time. Even after the Code composer debugger halts the program and assumes control of the target, information already captured through embedded DSP/BIOS instrumentation can provide valuable insight into the sequence of events that led up to the current point of execution.

9 Claims, 1 Drawing Sheet

DEVELOPING AND DEPLOYING REAL-TIME HIGH-PERFORMANCE APPLICATIONS WITH DSPS

FIELD OF THE INVENTION

This invention relates in general to applications of Digital Signal Processors (DSPs) and more particularly to developing and deploying real-time high performance applications with DSPs.

BACKGROUND OF THE INVENTION

The convergence of signal processing and I/O and embedded control functions on DSPs is changing DSP software development in two important ways. Fist, increased application complexity is placing greater emphasis on tools that enable designers to quickly produce efficient, reliable, maintainable production code. Equally important, the integration of real-time control and signal processing is placing a greater emphasis on analysis tools that can address increasingly subtle timing problems that are difficult to debug.

DSP program generation and debug tools have improved considerably over the years. But they still fail to address the real-time requirements of signal processing applications, particularly in the latter stages of the development cycle when the designers begin to integrate signal processing algorithms with I/O drivers, control tasks and other system components. Here, software modules that have been coded and tested separately fail in seemingly unpredictable ways when combined into a single program and subjected to live data. Often the culprits are subtle timing errors that arise infrequently, making them difficult to track.

Traditional program debuggers are useful for testing and debugging individual software modules, but tend to mask timing errors. In particular, when standard debuggers halt the program in order to obtain information about it, interrupts are disabled and real-time I/O is blocked. This changes system dynamics and often makes the problem disappear. Many designers supplement their debuggers with hardware tools such as logic analyzers and oscilloscopes in order to enhance real-time analysis capability. Others embed software trace buffers within the target application which collect information as the program executes. But these adhoc techniques are often inadequate, increasing the likelihood that elusive bugs will creep into the production software. Moreover, these techniques are difficult to use with code that has been deployed in production systems, making it nearly impossible to detect bugs once they have reached the production code.

What the DSP industry needs is a standard means of implementing DSP applications, one that enables critical aspects of program behavior to be monitored as the program executes in real time. These instrumentation facilities must be standardized so that third party tools can take advantage of them. They must also be efficient enough to leave in the production software, thereby giving manufacturing test and field diagnostic tools the insight needed to uncover bugs that arise after the software development process has been completed.

SUMMARY OF THE INVENTION

To address the need for enhanced real-time analysis, Texas Instruments Inc. has developed a standard embedded infrastructure for its DSPs that provides unique visibility into real-time program execution. Integrated with TI's Code Composer Studio development environment, this infrastructure consists of two components: 1) DSP/BIOS, a tiny target-based run-time system that captures event and statistical information for the application and uploads it to the host (via a standard physical link such as JTAG) as the application executes in real-time; this DSP/BIOS system is integrated with the target application (C or DSP assembler); 2) Scope, a suite of host-based tools that allows designers to visually trace, monitor, and probe the DSP application as it executes in real time. Even after the Code composer debugger halts the program and assumes control of the target, information already captured through embedded DSP/BIOS instrumentation can provide valuable insight into the sequence of events that led up to the current point of execution.

DETAILED DESCRIPTION OF THE PREFERRED EMBODIMENTS

Figure 1:
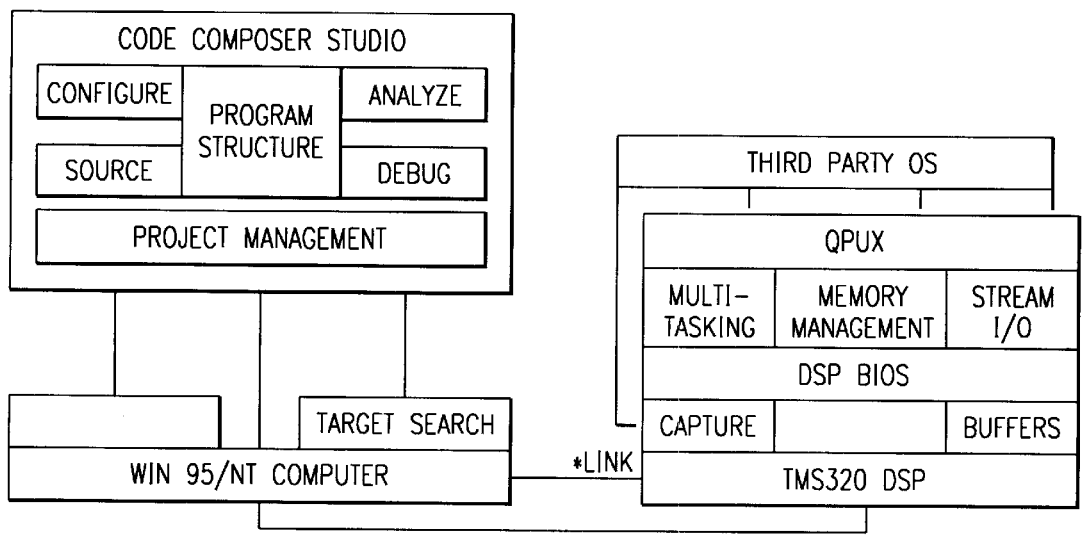
FIG. 1 illustrates the Texas Instruments Code Composer Studio Development Environment.

Integrated with TI's Code Composer Studio development environment, this infrastructure consists of two components: 1) "DSP/BIOS", a tiny target-based run-time system that captures event and statistical information for the application and uploads it to the host (via a standard physical link such as JTAG) as the application executes in real-time; 2) "Scope", a suite of host-based tools that lets designers visually trace, monitor, and probe the DSP application as it executes in real time.

"DSP/BIOS" and "Scope" build on the code-level view and probe capabilities provided by the Code Composer debugger, making it easy for designers to track the flow of data through their system. Just as the Code Composer debugger's probe facilities enable designers to verify functional integrity using file-based I/O simulation, "Scope" provides critical visibility during actual program execution. Even after the Code Composer debugger halts program execution and assumes control of the target, information already captured through embedded DSP/BIOS instrumentation can provide valuable insight into the sequence of events that led up to the current point of execution.

Later in the software development cycle, when subtle timing problems arise, Scope assumes an expanded role as the software counterpart of the ubiquitous hardware logic analyzer. Even after software development concludes, the "Scope" tools and embedded DSP/BIOS run-time services provide the foundation for advanced manufacturing test and field diagnostic tools that can interact with application programs in operative production systems through the existing JTAG infrastructure.

DSP/BIOS provides basic run-time services such as low-latency threading, memory management and I/O to programs executing on the DSP target hardware. It also provides real-time capture and statistics that supply information about the target DSP to the host-based Scope analysis tools. These facilities are integrated directly into core DSP/BIOS services such as signals (tasks), hardware interrupts and pipes. However, they may also be explicitly invoked through API calls that are embedded within the target application source code.

The DSP/BIOS performs many of the same target control and data gathering functions performed by traditional debug monitors. Unlike debug monitors, however, which exist apart from and are largely transparent to the target application, the DSP/BIOS run-time system is integrated with the target application (C or DSP assembler). This close coupling automatically instruments the target captured and uploaded to the host as the application executes.

The DSP run-time system occupies less than three kwords or target memory and consumes less than 1 MIPS or processing power with all instrumentation enabled. Equally important, the DSP/BIOS firmware is packaged as a library of relocateable, reentrant object modules (subroutines). Only those DSP/BIOS modules that are actually used in the application are linked into the application.

The DSP/BIOS run-time system's small size makes it practical to embed directly into a DSP's on-chip boot ROM. The system's small size, minuscule processing overhead, and flexible configuration also make it practical to leave DSP/BIOS instrumentation facilities embedded within the production software. This makes it possible to give test and field service engineers the same visibility into target program behavior that software developers have in the lab.

To simplify DSP/BIOS configuration, Code Composer Studio provides a graphical host-based configuration tool that makes it easy for developers to control a wide range of parameters accessed by the DSP/BIOS run-time system. It also serves as a special-purpose visual editor for creating and assigning attributes to individual run-time objects (threads, streams, etc.) that are used by the target application program in conjunction with DSP/BIOS API calls. All DSP/BIOS objects are statically configured and initialized in order to minimize target memory usage, enhance error checking and facilitate static program analysis.

Figure 2:
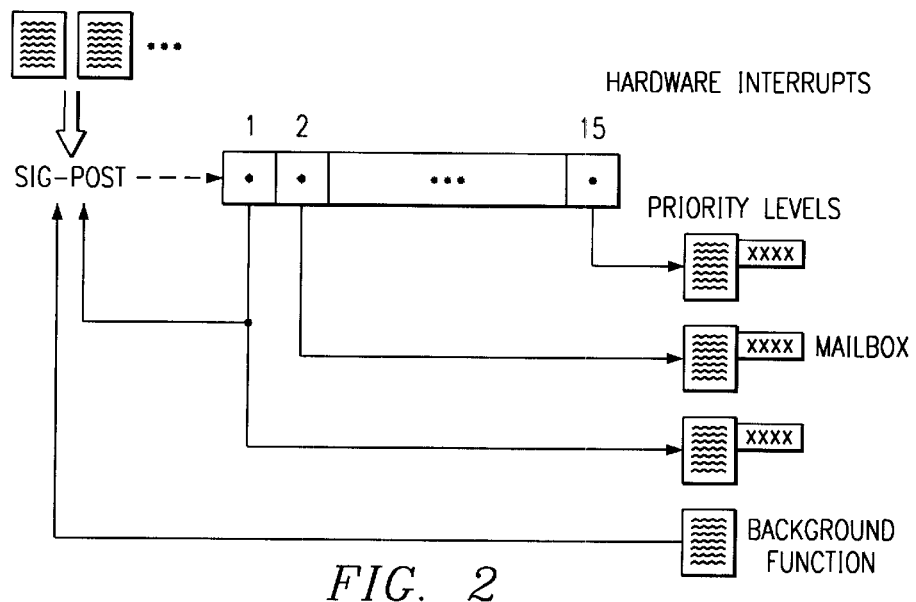
FIG. 2 illustrates the DSP BIOS scheduling model.

The DSP/BIOS' low-latency threading and interrupt processing facilities provide the overarching framework for partitioning complex applications into manageable components. DSP/BIOS uses a static, event-driven threading model that is an extension of the interrupt service routine (ISR) paradigm as illustrated in FIG. 2. Flexible, yet efficient, this three tiered model is based on three kinds of execution objects: Hardware interrupts, foreground SWIs and background threads. ISRs, triggered by hardware interrupts, are automatically prioritized by the hardware and implicitly block on events that drive a DSP's interrupt pin. Once activated, ISRs run until completion. Interrupts are disabled while ISRs execute. As a result, ISRs typically run for only a few microseconds, just long enough to acknowledge the interrupt, store a small amount of context, and activate the second level of interrupt processing, which is handled by foreground threads. The interrupt latency for a 200 MHz TMS320C6201 is just 120 nsec.

SWIs, also patterned after ISRs, bridge the gap between high-priority interrupt routines and low priority background threads. The scheduling latency for SWIs is just one microsecond for a 200 MHz C6201. This minuscule overhead makes them ideal for creating efficient multitasking hierarchies, particularly for applications whose processing cycles fall under the 10-ksample threshold. It also makes them ideal for structuring communications programs employing multiple algorithms (i.e., voice coding, tone detection, and echo cancellation) executing at different rates. SWIs can be activated by either ISRs or program threads. Once posted, the signal associated with that handler is scheduled for execution. SWIs run until completion unless pre-empted by an ISR or higher priority software interrupts. Interrupts are always enabled while SWIs are executing. SWIs typically run for about 100 microseconds, calling on background threads to handle more lengthy processing functions.

Background threads execute when no other program signal handlers or interrupt routines are active. Background threads cannot be prioritized. They execute in a round-robin fashion at a single priority level just below that of signals. Interrupts are always enabled while background threads are executing.

DSP/BIOS event logging and resource monitoring facilities provide the foundation for Scope's real-time analysis capabilities. Event logging enables programmers to trace the behavior of target applications by facilitating the capture, upload, and display of discrete software events while the target program executes. Resource monitoring efficiently tracks statistical information about program variables over time. Both event and statistical information are displayed at run-time by Scope, providing a system level view of the application's behavior. To minimize the impact on target application execution, this information is uploaded and displayed by Scope by threads running at the lowest priority level. The information is temporarily stored in a buffer of user defined size until DSP MIPS become available.

Event logging lets programmers see where the program has been, what events led up to its current point of execution, and whether these event sequences form regular patterns. Events can be logged explicitly by independent real-time threads in the target program through DSP/BIOS API calls, or implicitly by the run-time system as control passes from thread to thread. The contents of target event logs can be uploaded and displayed by Scope during program execution, either textually (as human-readable messages within a scrolling console window) or graphically (as a moving time line).

Event log entries occupy only four words of memory. Moreover, DSP/BIOS event log API calls execute in well under 1 usec on a 16-bit TMS320 DSP. This high efficiency level makes it practical to embed event logs anywhere in the program source—even in the most time-critical assembly language interrupt routines. It also makes it practical to leave event logs in place within production systems, where they can be used to enhance field and factory diagnostic tools.

Resource monitoring uses accumulators to gather statistical information about time-varying values in the target application program. These statistics are ideal for real-time computation of application parameters such as pitch, gain, and closed loop errors that depend on statistical averaging. They're also useful for profiling the performance of data-dependent algorithms. Accumulator objects compute and store three kinds of statistical values using a series of data values supplied by the target application during the course of execution: count, which is the number of values contained in the application-supplied data series; total, which is the arithmetic sum of the individual data values in this series; and maximum, which is the largest value encountered in this series. As with event logs, the contents of accumulators are periodically uploaded to Scope and displayed in a variety of formats. Accumulators occupy minimal memory (three words) and incur minimal processing overhead (less than 0.5 usec). As such, the accumulators provide a means of monitoring program activity from an adjoining host with little time or space impact upon the target. The efficiency of the accumulators also makes them well suited to deployment in production systems.

Programmers can selectively enable and disable the real-time capture of program information by event logs and statistics accumulators. This selective enabling and disabling of the real-time capture of information can be done directly through the DSP/BIOS API, or interactively through the host-based Scope utility. Either way, this facility simplifies real-time analysis by providing precise control over which forms of data capture are active at any point in time. This facility also enables programmers to maximize memory and execution efficiency. The run-time overhead associated with event logging and statistics accumulation may be small. Nonetheless, some developers may want to trade the degree of intrusiveness introduced by these mechanisms against the amount of useful information yielded about the program during its course of execution. This option lays the foundation for interactive field and factory diagnostic tools that can selectively activate real-time trace facilities embedded within production application programs on-the-fly.

Figure 3:
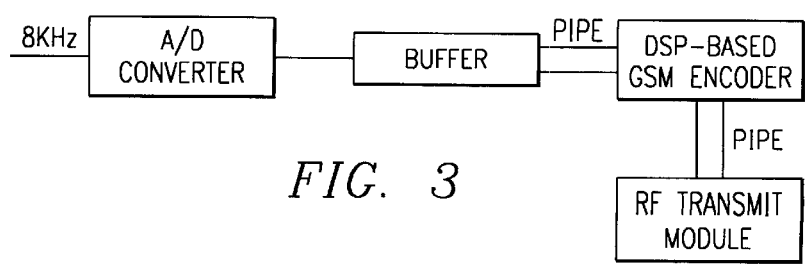
FIG. 3 illustrates DSP BIOS in a base station application of an encoder.

An example of DSP/BIOS in a basestation application is now described. The simple GSM basestation vocoder depicted in FIG. 3 shows how DSP/BIOS facilities might be used in a real system. The DSP encodes data that it receives from an 8-kHz, 16-bit A/D converter and outputs a compressed 13-KBPS signal. An ISR moves data from the converter to a buffer. When the buffer is full, the ISR passes the data to a pipe, which triggers the GSM coder. The pipe is implicitly instrumented, automatically providing information about the number of SWIs that are triggered. Capture facilities built directly into the DSP/BIOS run-time system also provide information about the type and order of execution for signals.

DSP/BIOS facilities are also invoked explicitly in this application through API calls. In the following code sequence, a target log is used to provide the status information "GSM example started." This message is communicated to the host by passing it a pointer. The host in turn, formats and displays the message in a trace window within DSP Scope.

```
Void main ()
{
    DSS_init();
    gsm_init (&encodeState);
    gsm_init (&decodeState);
    LOG_printf (&GSM_trace, "GSM example started. ");
    /* fall into BIOS idle loop */
    return;
}
```

With traditional target-only solutions, where the target RTOS is not aware of the debugger, the DSP dumps the message into a buffer. The emulator or debugger, in turn, accesses this buffer and uploads the data to the host. The problem with this approach is that the DSP has to provide the processing needed to format and move the data into the buffer, which not only disrupts program execution, but does so in an unpredictable manner. With DSP/BIOS, all of the processing is handled by the host. Thus, the overhead associated with moving data from the target to the host is reduced from thousands of DSP clock cycles to tens of DSP clock cycles. Moreover, off loading the processing to the host makes the impact on DSP program execution more deterministic.

The use of DSP/BIOS accumulators yields comparable improvements in performance and determinism. In this application, accumulators are used to provide statistical information such as the number and frequency of interrupts, the number of buffers available for processing, and the time sequence for signal execution. The following code sequence shows an accumulator used for profiling.

STS_set (&preSts, CLK_gethtime ( );
Preprocess (S, s, so);
STS_delta (&preSts, CLK_gethtime ( ));

Specifically, the accumulator is used to record the number of clock cycles needed to execute the procedure preprocess. Note that this sequence does not require the execution of a breakpoint on entry and exit. Thus, this sequence consumes just tens of DSP clock cycles. Again, the same routine initiated by an emulator, which has to query the status of the target machine following breakpoints, would occupy thousands of DSP clock cycles, and in a nondeterminent fashion.

The DSP/BIOS un-time system and its host-based Scope utilities provide a versatile platform for developing, debugging, and instrumenting real-time DSP-based communications applications. Equally important, the run-time system has minimal impact on both memory usage and run-time efficiency. This unique combination of functionality and efficiency should make DSP/BIOS welcome in even the most resource-constrained signal processing applications

We claim:

1. A real-time software debugging routine of a target application comprising;

a target-based run-time system integrated into the target application for capturing event and statistical information from the application, logging said event information and then uploading said information to a host based software counterpart of a hardware logic analyzer as said target application is executing; and a software counterpart of a hardware logic analyzer for the capture of timing problems and for the analyzing and displaying of discrete software events and statistical information about program variables over time during execution of said target program;

wherein said discrete software events are operable to be logged explicitly using independent real-time threads in said target application using DSP/BIOS API calls or implicitly by said run-time system as control passes from thread to thread.

2. The debugging routine according to claim 1, wherein said discrete software events and statistical information about program variables are temporarily stored in a buffer of user defined size until DSP MIPS become available.

3. The debugging routine according to claim 2, wherein said information to be displayed is displayed via threads running at the lowest priority level.

4. The debugging routine according to claim 1, wherein said event logging creates event log entries and said event log entries occupy four words of memory.

5. The debugging routine according to claim 1, wherein said DSP/BIOS event log API calls execute in well under 1 µsec on a 16-bit DSP.

6. The debugging routine according to claim 1, wherein said run-time system provides basic run-time services such as low-latency threading, memory management and I/O to programs executing on the DSP target hardware.

7. The debugging routine according to claim 6, wherein said low-latency threading is accomplished via a static, event-driven threading model which is an extension of an interrupt service paradigm.

8. The debugging routine according to claim 7, wherein said event-driven model is a three tiered model which is based on the three execution objects of hardware interrupts, foreground SWIs and background threads.

9. The debugging routine according to claim 1, wherein said target application is implemented in either C or DSP assembler programming language.

* * * * *